UNITED STATES PATENT OFFICE.

HARRY WILLIAMS CHARLTON, OF JONES POINT, NEW YORK.

COMPOSITE PLASTIC ARTICLE AND PROCESS OF PRODUCING THE SAME.

1,242,421.　　　　　Specification of Letters Patent.　　Patented Oct. 9, 1917.

No Drawing.　　　Application filed May 22, 1917. Serial No. 170,330.

*To all whom it may concern:*

Be it known that I, HARRY WILLIAMS CHARLTON, a citizen of Canada, residing at Jones Point, in the county of Rockland and State of New York, have invented certain new and useful Improvements in Composite Plastic Articles and Processes of Producing the Same; and I do hereby declare the following to be a full, clear, and exact description of the invention, such as will enable others skilled in the art to which it appertains to make and use the same.

This invention relates to composite plastic articles in general but especially to composite bricks, and processes of making the same, and has for its object to produce articles of this nature of a superior quality and at a less cost than those heretofore proposed.

With these and other objects in view the invention consists in the novel steps and combinations of steps constituting the process and in the novel composition of matter constituting the product all as will be more fully hereinafter disclosed and particularly pointed out in the claims.

In order that the invention may be the more clearly understood I will describe it in connection with the manufacture of composite brick, it being understood that the same or substantially the same procedure is applicable to the making of tiles for floors and roofs, artificial stone, terra cotta, etc.

I employ, as a cementing material, in the manufacture of brick, a composition of matter obtained as a result of the digestion process disclosed in my copending application Sr. No. 170330, filed May 22 1917, and entitled Process of obtaining alkali and a cementing material from green sand.

Said process in brief consists in digesting ordinary green sand containing glauconite with a dolomitic, or other lime at a pressure above 190 pounds to the square inch, and until substantially all the iron, aluminum and silicon present in the green sand have combined with the lime to form silicates, and until any excess of lime that may be present has experienced a profound change in its physical properties. The insoluble residue thus produced is suitably separated from the liquor, and it is then either before or after drying mixed with bank sand, ground rock, sea sand or other silicious material to form a plastic mass of the proper consistency. Even should loam be present in the sand, the binder is so efficient in its holding qualities that the useful properties of the brick will not be destroyed. It is found that the proportions of the binding material may be varied from say $2\frac{1}{2}\%$ to $50\%$ of the whole mixture, and that the proportions of the sandlike material may, of course, be corespondingly varied from say $97\frac{1}{2}\%$ down to $50\%$ of said mixture, but I prefer to employ a mixture containing about $30\%$ binder and $70\%$ sand.

The sand and binder are thoroughly incorporated by any desirable mechanism into a mixture of a suitable consistency and the materials are then subjected to the ordinary pressures in suitable brick making machines, whereupon the brick are piled in cars and run into the usual hardening cylinders where they are subjected to steam pressure at from say 100 to 135 pounds to the square inch. They are held subject to the action of said steam for from say eight to twelve hours, whereupon the binding material will be found to have set and the process is completed.

Bricks and other articles produced as above disclosed will be of a greenish white color, and when it is desired to impart a permanent buff color to them, I have discovered that this may be accomplished by calcining at least a portion of the said binding material before mixing the same with the sand.

The resulting calcined material imparts a beautiful yellow ocher color to the brick, and its binding qualities may be improved by mixing therewith a quantity of the snow white binding material obtained by treating feldspar instead of green sand in accordance with the process mentioned above, or in accordance with the process disclosed in my other copending application Sr. No. 96815, filed May 11, 1916, and entitled Brick manufacture. I find that excellent results are obtained when the binding material is composed of say $20\%$ of the above calcined material and $80\%$ of the material obtained from the feldspar process of said application #96815.

In addition to the above, I also find that excellent results are attained when the calcined binding material produced from the green sand process is mixed with a greater or less proportion of the modified lime product obtained according to the process disclosed in my other pending application Sr.

No. 161893, filed Apr. 13, 1917, and entitled Process of manufacturing sand lime brick. This said process consists briefly in subjecting the ordinary lime of commerce to a digestion process in an autoclave at a pressure exceeding 190 pounds to the square inch, and preferably at very much higher pressures. The digestion process is found after say about 30 minutes to have profoundly changed the physical properties of the lime. That is to say, instead of the lime being of the composition of $CaO.H_2O$, after the digestion process it probably has the composition of $(CaO)_2.H_2O$, and it is found to consist of a very plastic, compressible mass, having a specific gravity less than the normal hydrate and less than the normal oxid $CaO$.

When employing this said modified lime, as a binder, in the making of bricks, and other plastic articles, I prefer to provide a mixture containing say 30% or 40% of the above calcined binding material, and about 70% or 60% of the above mentioned modified lime.

With the binding material thus produced I thoroughly incorporate sand or other silicious material and form the bricks or other plastic articles in the manner above outlined, whereupon they are subjected to the same steam pressure and are found to be of a beautiful ocher color and to possess great tenacity and to resist disintegrating agencies.

Bricks that are produced in the manner above disclosed and from the materials specified, are found to have much higher crushing pressures than do ordinary sand-lime bricks, they do not disintegrate and weather like ordinary brick and they have exceedingly sharp corners which do not break down or weather as do ordinary sand-lime brick.

In addition to the above, as is well known, sand-lime brick have a tendency to further hydrate after they have been made and especially is this the case if any magnesia is present. In the brick produced according to this invention, on the other hand, all the materials employed are thoroughly hydrated during the process of manufacture and no further disrupting chemical actions take place. The result is that brick made according to the present invention have a much longer life, and actual trials have shown they will stand very much severer tests of all kinds than will sand lime bricks.

In addition to the above, an important feature of the invention resides in the fact that so efficient is the binding material that it is not necessary to employ sand having sharp edges. This enables me to employ ordinary sea sand, or other similar material which cannot be successfully employed at all in the making of sand-lime brick.

It is obvious that those skilled in the art may vary the details of the process as well as the composition of the product without departing from the spirit of the invention and therefore, I do not wish to be limited to the above disclosure except as may be required by the claims.

What I claim is:—

1. The process of making composite plastic articles which consists in mixing in suitable proportions silicious material and a binding material containing calcium and iron in a silicate combination; suitably molding the mass thus produced; and subjecting the molded article to the action of steam under pressure, substantially as described.

2. The process of making plastic articles which consists in mixing in suitable proportions sand and a binding material obtained as the product of a digestion process and containing the silicates of calcium and iron; suitably shaping the mass thus produced; and subjecting the formed articles to the action of steam under pressure until said binding material has set, substantially as described.

3. The process of making a plastic article having a yellow color which consists in calcining a binding material obtained as a result of subjecting green sand mixed with lime to a digestion process and containing the silicates of calcium and iron; adding to the binding material thus produced a suitable quantity of silicious material; forming the mixture thus obtained into a suitable shape; and subjecting the article thus produced to the action of steam under pressure, substantially as described.

4. The process of making a plastic article having a yellow color which consists in calcining a binding material obtained as a result of subjecting green sand mixed with lime to a digestion process and containing the silicates of calcium and iron; mixing with the calcined product thus produced an additional quantity of a binding material; adding to the binding material mixture thus produced a suitable quantity of silicious material; forming a mixture thus had into a suitable shape; and subjecting the articles thus produced to the action of steam under pressure, substantially as described.

5. The herein described plastic article comprising silicious material and a cementing material formed as the result of digesting green sand with lime, and containing a silicate of calcium and iron, substantially as described.

6. The herein described plastic article comprising silicious material and a cementing material containing a silicate of calcium and iron produced by digesting green sand with lime, said cementing material also containing a quantity of other cementing material obtained by digesting feldspar with lime, substantially as described.

7. The herein described plastic article comprising silicious material and a calcined cementing material containing a silicate of calcium and iron produced by digesting green sand with lime, said cementing material also containing a quantity of other cementing material, not calcined, obtained by digesting feldspar with lime, substantially as described.

8. The herein new composition of matter useful as a cementing material, consisting of an insoluble residue obtained from green sand mixed with an insoluble residue obtained from feldspar, said first mentioned residue being calcined to give it an ocher color, and both of said residues being formed as the result of digestion processes, substantially as described.

In testimony whereof I affix my signature.

HARRY WILLIAMS CHARLTON.